(No Model.)

A. E. ROWLEY.
MORTISING CHISEL.

No. 251,641. Patented Dec. 27, 1881.

Witnesses:
J. W. Garner
W. S. D. Haines

Inventor:
Amos E. Rowley,
by Howard A. Snow,
Attorney.

UNITED STATES PATENT OFFICE.

AMOS E. ROWLEY, OF WINOOSKI IN COLCHESTER, VERMONT.

MORTISING-CHISEL.

SPECIFICATION forming part of Letters Patent No. 251,641, dated December 27, 1881.

Application filed July 8, 1881. (No model.)

*To all whom it may concern:*

Be it known that I, AMOS E. ROWLEY, a citizen of the United States of America, residing at Winooski in Colchester, in the county of Chittenden and State of Vermont, have invented certain new and useful Improvements in Mortising-Chisels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to mortising-chisels; and it consists in the construction and arrangement of the several parts, as will be hereinafter more fully set forth.

The accompanying drawings fully illustrate my invention.

Figure 1 is a side elevation of the chisel. Fig. 2 is the spring, and Fig. 3 is a front view of the shank.

$a$ is the chisel, provided with an adjustable spring, $d$. It has formed upon its back the shoulder $e'$ and plane surface $a'$, to which the spring is fastened by the screw $e$, passing through an elongated slot, $h$, and operating in a threaded hole placed near the lower end of the surface $a'$. Upon the opposite side of the chisel from the screw $e$, and at a point between it and the shoulder $e'$, is the adjusting-screw $a^2$. It extends entirely through the body of the chisel and bears against the upper end of the spring $d$, as shown.

The lower end of the chisel is provided with a cutting-edge, $b$, and lips $b'$ $b'$, which extend upward along its side and have between them the recess $c$, adapted to receive the lower end of the spring $d$, forming a channel to carry the chips away from the cutting-edge and out of the mortise.

Extending from the upper end of the lips $b'$ $b'$ to the shank of the chisel are upward-cutting edges $g$ $g$ and grooves $g'$ $g'$, which operate to cut loose and carry off chips that may stick in the mortise and clog the chisel.

By this method of securing the spring to the chisel I am enabled to increase the pressure of its lower end against the bottom of the recess $c$, by which means the chisel can be readily adapted to cut either soft or hard wood.

It will be seen that by a very slight loosening of the screw $e$, and by increasing the pressure of the adjusting-screw $a^2$ against the upper end of the spring, the lower end will be pressed more firmly against the bottom of the recess, and that by loosening up the adjusting-screw and tightening the screw $e$ the spring will return to its normal tension.

I am aware that a spring applied to a mortising-chisel is old; but

What I claim as my invention, and desire to secure by Letters Patent, is—

1. In a mortising-chisel, the screw $e$, operating in a threaded hole in the plane surface $a'$, and adapted to secure a spring thereto, and adjusting-screw $a^2$, placed upon the opposite side of the chisel from the screw $e$, extending entirely through it, and adapted to bear against the upper end of the spring, substantially as and for the purposes set forth.

2. A mortising-chisel provided with upward-cutting edges $g$ $g$ and grooves $g'$ $g'$, located between the upper end of the lips $b'$ $b'$ and the shank of the chisel, substantially as shown.

In testimony whereof I affix my signature in presence of two witnesses.

AMOS E. ROWLEY.

Witnesses:
CHARLES H. SHAW,
T. A. DOUBLEDAY.